United States Patent Office 3,547,771
Patented Dec. 15, 1970

3,547,771
ADHESIVE OF POLYVINYL ACETATE, ACID
METAL SALT AND CARBOXYLIC ACID
Stanley R. Sandler, Springfield, Pa., assignor to Borden,
Inc., New York, N.Y., a corporation of New Jersey
No Drawing. Filed Nov. 20, 1967, Ser. No. 684,485
Int. Cl. B32b 21/06, 21/14
U.S. Cl. 161—251
8 Claims

ABSTRACT OF THE DISCLOSURE

This invention relates to adhesive compositions which form water resistant bonds when cured and more particularly to aqueous adhesive compositions which are acid catalyzed and curable at ambient temperature comprising a vinyl acetate polymer, an acid metal salt curing agent, and a pot life extender selected from the group consisting of substituted and unsubstituted carboxylic acids.

BACKGROUND OF THE INVENTION

Vinyl acetate polymers used alone or with cross-linking resins and cured with acidic materials provide generally suitable adhesives which give water resistant bonds when cured at ambient temperature. The pot life of these adhesives varies with the particular acidic material used as the curing agent, with acid metal salts giving the shortest pot life. The adhesives thicken, gel or exhibit thixotropic behavior making them unsuitable for use. This short pot life has mitigated against the use of such acid metal salts as curing agent even though they do impart desirable adhesive properties including, for some, indistinguishable glue lines and highly water resistant bonds. The short pot life renders the use of such acid salts commercially undesirable.

SUMMARY OF THE INVENTION

It has now been unexpectedly found that carboxylic acids can be utilized to stabilize the subject adhesives and increase the pot life thereof.

Briefly stated, the present invention comprises an aqueous adhesive composition curable at room temperature comprising a vinyl acetate polymer, an acid metal salt curing agent, and a pot life extender selected from the group consisting of substituted and unsubstituted mono-, di-, and polycarboxylic acids. The invention also encompasses cellulosic structure made with such adhesives. In a preferred embodiment, a phenolic resin cross-linkable with the vinyl acetate polymer is included in the adhesive composition for maximum water resistance.

DETAILED DESCRIPTION

As to materials, the carboxylic acid used is preferably a hydroxy monocarboxylic acid, a dihydroxy dicarboxylic acid, or an amino carboxylic acid. Also satisfactory are other substituted or unsubstituted mono-, di-, and polycarboxylic acids. Specific examples are lactic acid, hydroxyacetic acid, tartaric acid, ethylene diamine tetraacetic acid, nitrilo triacetic acid, maleic acid, malonic acid, fumaric acid, oxalic acid, succinic acid, itaconic acid, acrylic acid, salicylic acid, benzoic acid, and mixtures thereof.

The curing agent must be an acid metal salt selected from the group consisting of zirconium, zirconyl, vanadium, bismuth, and antimony acid salts and mixtures thereof. Specific examples are antimony trichloride, vanadium oxychloride, bismuth oxychloride, zirconyl nitrate, zirconium nitrate, and basic zirconium oxychloride.

As used herein, the term "vinyl acetate polymer" means any homopolymer or copolymer latex or emulsion used for preparing water resistant adhesives as more particularly illustrated in Pats. Nos. 2,902,458, 2,902,459 and 3,274,048, and for best water resistance, copolymers of vinyl acetate and acrylic acid, preferably one containing about 98% vinyl acetate and 2% acrylic acid.

The phenolic resin used is preferably a phenol-formaldehyde adduct such as a resole. Other suitable examples are described in Pat. No. 2,902,459.

As to proportions, there must be at least .005 to about 3 parts by weight of the pot life extender for each part by weight of the curing agent. Higher amounts of extender may be used but they do not improve the pot life and, in fact, depending upon the particular curing agent may interfere with obtaining bonds of suitable water resistance.

For best results it is preferred to use in the adhesive, 40–100 parts vinyl acetate polymer, 0–60 parts phenolic resin, 1–12 parts of curing agent, and .05–3 parts of pot life extender (based on the weight of the curing agent).

In compounding the adhesives, if thermosetting agents are used, it is recommended that the thermosetting agent be first blended with the vinyl acetate polymer latex. The curing agent is not added until shortly before the adhesive composition is to be used. The pot life extender is added either with or prior to addition of the curing agent.

The invention will be further described in connection with the following examples of the practice of it which are set forth for the purpose of illustration only.

EXAMPLE I

Three adhesives were prepared having the following compositions:

| | Weight in grams | | |
|---|---|---|---|
| | A | B | C |
| Vinyl acetate polymer* (50% solids) | 100 | 100 | 100 |
| Phenol-formaldehyde resole (75% solids P/F ratio of 1.32/2.24) | 0 | 7.2 | 7.2 |
| Hydroxy acetic acid (70%) | 0 | 0 | 1.5 |
| Zirconium oxychloride (40%) | 8 | 8 | 8 |

*98% vinyl acetate and 2% acrylic acid.

The zirconium curing agent was added and the viscosity measured after 17 hours on a Brookfield Viscometer. The results were as follows:

Viscosity in cps.
Adhesive A _____ >$10^5$
Adhesive B _____ >$10^5$
Adhesive C _____ 8,000

The adhesives were also tested using the accepted Product Standard PSI–66 (National Bureau of Standards) as recommended in TS–101(d). The adhesive was applied at the rate of 45 lbs./1,000 sq. ft., single glue line, to each side of the cores of a 3/16 inch thick Douglas fir veneer. The cores were bonded with 1/8 inch thick Douglas fir veneer on both sides and the specimens kept compressed for 20 minutes under light pressure and then under 150 p.s.i. for one hour at room temperature. The specimens were then aged for 7 days in a constant temperature and humidity environment and the specimens cut into 1″ by 3″ portions and tested for tensile shear strength in Dry, Boil, and Vacuum-Pressure tests as set forth in the standards noted above. The results were as follows:

TABLE I

| | Tensile shear strength (p.s.i.), percent wood failure | | |
|---|---|---|---|
| | Dry | Boil | Vacuum-pressure |
| Adhesive A | 120–100 | 5–0 | 5–0 |
| Adhesive B | 100–100 | 65–100 | 75–100 |
| Adhesive C | 75–100 | 95–100 | 60–60 |

EXAMPLES 2–6

A series of adhesives were made with different curing agents. The adhesives were compounded and tested as set forth in Example 1 and the results and adhesive formulations (in grams) are set forth in Table II.

TABLE II

| Example No. | Latex (50% solids) | Phenolic resin | Hydroxy acetic acid | Curing agent [1] | Viscosity after 17 hrs. (cps.) | Tensile shear strength, p.s.i., percent wood failure | | |
|---|---|---|---|---|---|---|---|---|
| | | | | | | Dry | Boil | Vacuum pressure |
| 2 | 100 | 7.2 | 0 | 5 | >10⁵ | 100-100 | 65-100 | 75-100 |
| 3 | 100 | 7.2 | 1.5 | 5 | 13,000 | 115-100 | 85-100 | 110-100 |
| 4 | 100 | 7.2 | 1.0 | 8 | 9,400 | 135-100 | 110-100 | 125-60 |
| 5 | 100 | 0 | 0 | 0 | 2,150 | 150-100 | 5-0 | 35-10D |
| 6 | 100 | 7.2 | 1.5 | 10 | 8,300 | 80-100 | 60-100 | 85-100 |

[1] A 50% aqueous solution of $Zr(NO_3)_4$ was used in Examples 2–6.

NOTE.—In the tensile shear strength, "D" indicates delamination.

EXAMPLE 7

A series of adhesives are made using the identical C formulation set forth in Example 1 except that the following pot life extenders are each separately, and in turn, substituted in equal proportions for the hydroxy acetic acid used therein: lactic acid, tartaric acid, ethylene diamine tetracetic acid, nitrilo triacetic acid, maleic acid, malonic acid, fumaric acid, oxalic acid, succinic acid, itaconic acid, acrylic acid, salicylic acid, and benzoic acid. In each case an adhesive of extended pot life is obtained as compared with adhesives not containing any of the extenders.

EXAMPLE 8

A series of adhesives are made using the identical C formulation set forth in Example 1 except that the vinyl acetate copolymers disclosed in Pats. Nos. 2,902,458, 2,902,459 and 3,274,048 referred to above are each separately, and in turn, substituted in equal proportions by weight for the vinyl acetate polymer disclosed therein. In each instance a stabilized adhesive results which also has a high water resistance when cured.

It is preferred to use the adhesives in the form of an aqueous composition with the solids percentage varied from 30% to 70% to give optimum adhesive results for the conditions prevailing. As previously noted, the adhesives of the present invention are most suitable for the bonding of cellulose materials, particularly wood, especially where water-resistant bonds are required.

It will be understood that it is intended to cover all changes and modifications of the examples of the invention herein chosen for the purpose of illustration which do not constitute departures from the spirit and scope of the invention.

I claim:
1. An aqueous adhesive composition curable under acidic conditions at ambient temperature to form a water-resistant bond comprising:
   (a) 40–100 parts vinyl acetate polymer;
   (b) 1–12 parts curing agent selected from antimony trichloride, vanadium oxychloride, bismuth oxychloride, zirconium nitrate, zirconyl nitrate and basic zirconium oxychloride;
   (c) 0.005–3 parts per each part of said curing agent of pot life extender selected from unsubstituted mono-, di-, and polycarboxylic acids and unsubstituted mono-, di- and poly-amino and hydroxy carboxylic acids.
2. The adhesive composition of claim 1 wherein said pot life extender is selected from hydroxy monocarboxylic acids, dihydroxy dicarboxylic acids, amino carboxylic acids and mixtures thereof.
3. The adhesive composition of claim 1 wherein said pot life extender is hydroxyacetic acid and said polymer is a copolymer of about 98% vinyl acetate and about 2% acrylic acid.
4. The adhesive composition of claim 1 including:
   (d) 0–60 parts phenol-formaldehyde resin cross-linked with said polymer for imparting maximum water resistance to said adhesive composition.
5. The adhesive composition of claim 4 wherein said polymer is a copolymer of vinyl acetate and acrylic acid.
6. A structure comprising at least two surfaces bonded together by the adhesive of claim 1.
7. A structure comprising at least two cellulosic surfaces bonded together by the adhesive of claim 2.
8. A structure comprising at least two wood surfaces bonded together by the adhesive of claim 4.

References Cited

UNITED STATES PATENTS

| | | | |
|---|---|---|---|
| 2,819,237 | 1/1958 | Daniel | 260—29.3 |
| 2,902,458 | 9/1959 | Teppema | 260—29.3 |
| 2,902,459 | 9/1959 | Teppema | 260—29.3 |
| 3,238,158 | 3/1966 | Conca et al. | 161—261 |
| 3,433,701 | 3/1969 | Armour | 260—29.3 |
| 3,444,037 | 5/1969 | Armour | 260—29.3 |

DONALD J. ARNOLD, Primary Examiner.

U.S. Cl. X.R.

260—29.3, 29.6 EM, 29.6 RU; 156—335, 327